(12) United States Patent
Skinner et al.

(10) Patent No.: US 8,810,163 B2
(45) Date of Patent: Aug. 19, 2014

(54) SYSTEM AND METHOD FOR VARIABLE SPEED MOTOR CONTROL WITH A SINGLE CONTROL SIGNAL

(71) Applicant: Nidec Motor Corporation, St. Louis, MO (US)

(72) Inventors: James L. Skinner, St. Louis, MO (US); Prakash B. Shahi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 104 days.

(21) Appl. No.: 13/676,666

(22) Filed: Nov. 14, 2012

(65) Prior Publication Data

US 2014/0132185 A1    May 15, 2014

(51) Int. Cl.
*H02P 5/74* (2006.01)
*H02P 5/00* (2006.01)

(52) U.S. Cl.
CPC ... *H02P 5/00* (2013.01); *H02P 5/74* (2013.01)
USPC .................. 318/51; 318/62; 318/66

(58) Field of Classification Search
CPC ....................................................... H02P 5/74
USPC ................ 318/51, 53, 59, 62, 66, 67, 68, 101
See application file for complete search history.

(56) References Cited

U.S. PATENT DOCUMENTS

| | | | |
|---|---|---|---|
| 3,745,778 A | 7/1973 | Attridge, Jr. | |
| 5,797,729 A | 8/1998 | Rafuse, Jr. et al. | |
| 7,164,242 B2 | 1/2007 | Federman et al. | |
| 7,661,274 B2 | 2/2010 | Crane et al. | |
| 7,719,214 B2 * | 5/2010 | Leehey et al. | 318/34 |
| 7,808,194 B2 * | 10/2010 | Egami | 318/432 |
| 8,096,139 B2 | 1/2012 | Taras et al. | |
| 8,239,068 B1 | 8/2012 | Rossi et al. | |
| 2005/0094343 A1 | 5/2005 | Mintz, Jr. | |
| 2005/0189888 A1 | 9/2005 | Federman et al. | |

* cited by examiner

*Primary Examiner* — Bentsu Ro
(74) *Attorney, Agent, or Firm* — Maginot, Moore & Beck, LLP

(57) ABSTRACT

In a motor control system, a controller generates a single control signal for a motor control unit in a first electric motor and another motor control unit in a second electric motor. The motor control units in the first and second electric motors operate the first and second electric motors at a first rate in response to the control signal being at a first level. The motor control unit in the first electric motor operates the first electric motor at a second rate and the motor control unit in the second electric motor operates the second electric motor at a third rate in response to the control signal being at a second level, the third rate being different than the second rate.

15 Claims, 4 Drawing Sheets

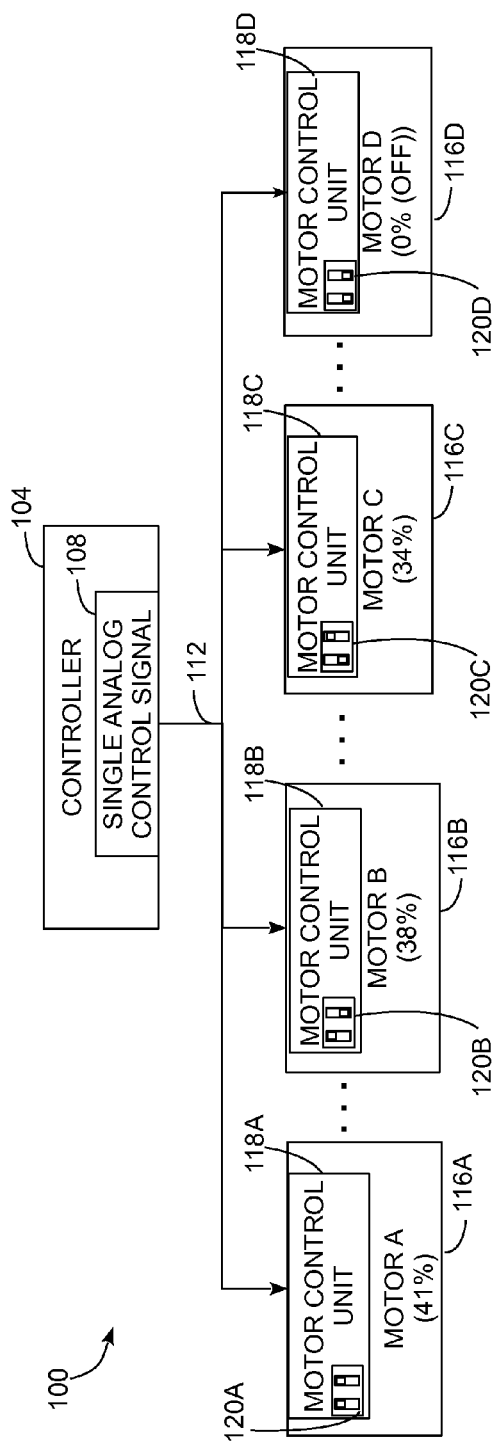
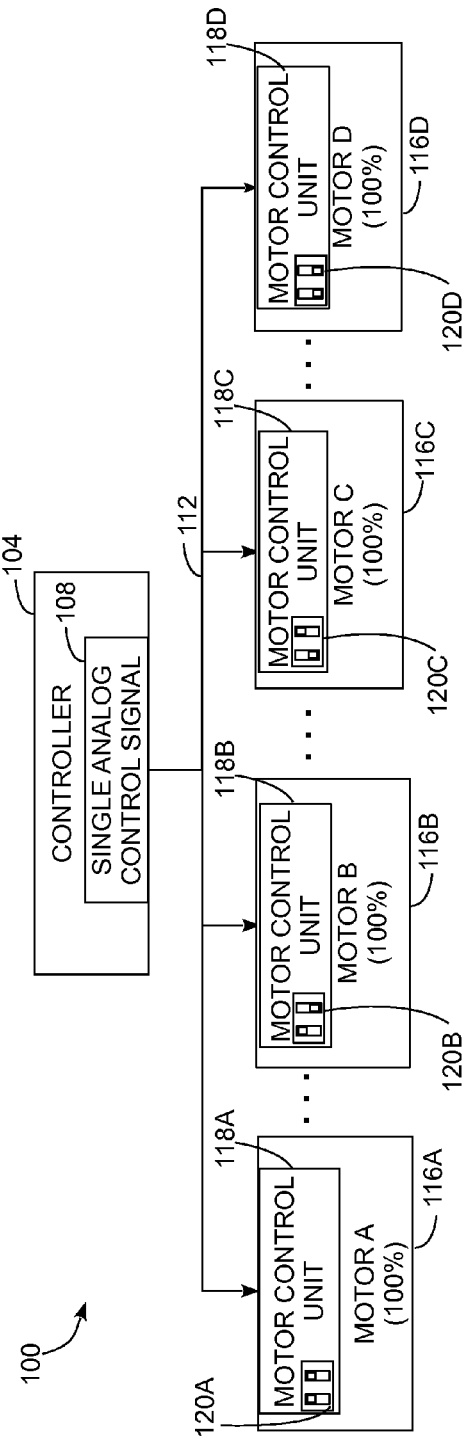
FIG. 1A
FIG. 1B

SYSTEM AND METHOD FOR VARIABLE SPEED MOTOR CONTROL WITH A SINGLE CONTROL SIGNAL

TECHNICAL FIELD

This disclosure relates generally to control systems for electric motors, and, in particular, to operating multiple electric motors in a system at different speeds.

BACKGROUND

Some commercial heating, ventilation, and air-conditioning (HVAC) systems include multiple fans and electric motors in multiple units that work together to provide heating and cooling to a building. For example, the air conditioning or refrigeration systems in many large buildings include multiple condenser units that are located on the roof of the building. Each condenser unit includes an electric motor that drives a fan to direct air over a radiator to cool and condense a refrigerant from a vapor phase to a liquid phase.

In many HVAC systems, multiple motorized units, such as condensers, operate in tandem to provide sufficient cooling capacity for a building or other facility. A central control unit is connected to the fan motors in each of the condenser units and is configured to activate the fan motors, deactivate the fan motors, and adjust the operating speed of the fan motors based on the cooling requirements of the building.

One challenge confronting HVAC systems that include multiple condenser units or other units that include electric motors is the operation of the individual units in an energy efficient manner. For example, in one existing HVAC system, a central controller can operate the fans in multiple condenser units at different speeds, but all of the fans must operate at the same speed. In some operating conditions, the HVAC system could operate more efficiently if only some of the motors operated simultaneously. In another embodiment, a single controller operates the fan in a single condenser unit, then the control signal from the controller is propagated to a second fan motor in a second condenser unit at a lower level, to a third motor in a third fan unit at still a lower level, etc. to enable a single control unit to operate the fans in multiple condenser units at different speeds. One drawback of the aforementioned system is that the controller is unable to operate the fans in all of the condenser units at a maximum speed in situations where the HVAC system is required to operate at high capacity.

One approach that controls multiple fan motors at different speeds includes a controller that communicates with each motor individually, either through individual control lines or through a digital control system that communicates using, for example, wired or wireless digital networking. While such systems are known to the art, the added complexity required in the controller and the added infrastructure required to run individual control wires or add digital control systems to the motors in existing HVAC units adds to the cost and maintenance burden for building and operating the HVAC system. Consequently, improvements to HVAC control systems that enable operating different motors in the HVAC system over a full range of different operating speeds during operation without requiring generation of individual control command signals for each motor would be beneficial.

SUMMARY

In one embodiment, a motor control system for controlling multiple electric motors has been developed. The system includes a first electric motor including a first electric motor control unit, a second electric motor including a second electric motor control unit, the second electric motor control unit, and a controller operatively connected to the first electric motor control unit and the second electric motor control unit. The first electric motor control unit is configured to operate the first electric motor at a first rate in response to receiving a control signal at a first level and at a second rate in response to receiving the control signal at a second level, and operate the first electric motor at a plurality of intermediate operating rates between the first rate and the second rate in accordance to a first predetermined control curve in response to receiving the control signal at an intermediate level between the first level and the second level. The second electric motor control unit is configured to operate the second electric motor at the first rate in response to receiving the control signal at the first level and at a third rate in response to receiving the control signal at the second level, the third rate being different than the second rate, and operate the second electric motor at another plurality of intermediate operating rates between the first rate and the third rate in accordance to a second predetermined control curve in response to receiving the control signal at the intermediate level between the first level and the second level. The controller is configured to generate a single control signal to operate both the first electric motor and the second electric motor. The control signal is at one of the first level, the second level, and one of a plurality of intermediate levels between the first level and the second level.

In another embodiment, a method for controlling multiple electric motors has been developed. The method includes generating a single control signal at one of a first level, a second level, and a plurality of intermediate levels between the first level and the second level, operating a first electric motor at a first rate in response to receiving the single control signal at the first level, operating the first electric motor at a second rate in response to receiving the single control signal at the second level, operating the first electric motor at a plurality of intermediate rates between the first rate and the second rate in accordance to a first predetermined control curve in response to receiving the control signal at one of the plurality of intermediate levels, operating a second electric motor at the first rate in response to receiving the single control signal at the first level, operating the second electric motor at a third rate in response to receiving the single control signal at the second level, the third rate being different than the second rate, and operating the second electric motor at another plurality of intermediate operating rates between the first rate and the third rate in accordance to a second predetermined control curve in response to receiving the control signal at one of the plurality of intermediate levels.

BRIEF DESCRIPTION OF THE DRAWINGS

FIG. 1A is a schematic diagram of a control system that generates a single control signal to operate multiple motors in an HVAC system at different rates.

FIG. 1B is a schematic diagram of the control system of FIG. 1A where the single control signal operates all of the motors at either a maximum or minimum operating speed.

DETAILED DESCRIPTION

Figure 2:
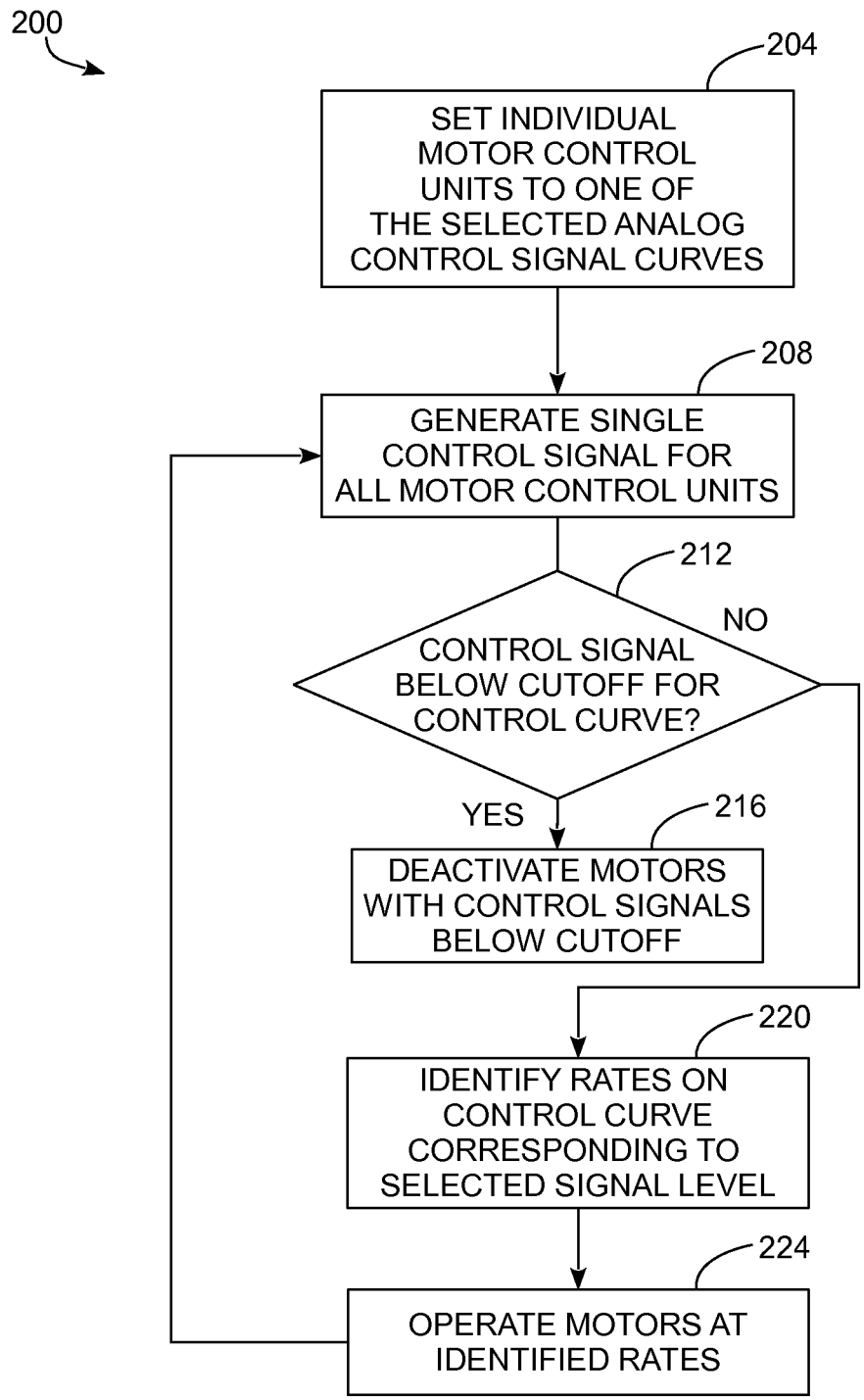
FIG. 2 is a block diagram of a process for configuring and operating the motors in the HVAC system depicted in FIG. 1A and FIG. 1B.

For a general understanding of the environment for the system and method disclosed herein as well as the details for the system and method, reference is made to the drawings. In the drawings, like reference numerals have been used throughout to designate like elements. As used herein, the term "control curve" refers to data that a motor control device references to identify an operating rate for the motor that corresponds to the level of a control signal. The controller deactivates the motor or operates the motor over a range of operating speeds between a minimum operating rate and a maximum operating rate with reference to the control curve and the control signal.

FIG. 1A and FIG. 1B are block diagrams that depict a motor control system that is used, for example, in an HVAC system. FIG. 1A and FIG. 1B include a controller 104 that is operatively connected to motor control units 118A, 118B, 118C and 118D. The motor control units 118A-118D are each configured to adjust the rate of rotation of motors 116A, 116B, 116C, and 116D, respectively. In the system 100, the controller 104 includes a control signal module 108 that generates a single control signal for all of the motor control units 118A-118D that is distributed through, for example, a single electrical connection 112. In one embodiment the motor control units 118A-118D are also digital control units or are hybrid analog/digital control units in an alternative embodiment. In many HVAC systems, the motors 116A-116B are electric motors that operate, for example, using alternating current (AC) or direct current (DC) electrical power. While FIG. 1A and FIG. 1B depict the system 100 with four motors 116A-116D and four motor control units 118A-118D, respectively, alternative configurations include two or more motors that each receive a single control signal from a controller such as the controller 104.

In one embodiment, the controller 104 is a digital controller that is, for example, operatively connected to one or more thermostats (not shown) and generates a control signal to operate the motors 116A-116D at different speeds to maintain a predetermined temperature within a building. In one embodiment, the control signal module 108 generates one electrical signal at a selected voltage level for each of the motor control units 118A-118D. During operation, the controller 104 changes the voltage level within a predetermined range, such as 0 V to 10 V, to increase and decrease the operating rates of the motors 116A-116D. As described below, the motor control units 118A-118D are each configured to respond to a single control signal differently to enable the motors 116A-116D to operate at different rates for some control signals, as depicted in FIG. 1A, while still enabling all of the motors to operate at a single rate for at least one predetermined control signal, as depicted in FIG. 1B.

In the system 100, each of the motor control units 118A-118D is configured to respond to a single control signal voltage using a predetermined control curve that is stored within a memory of each of the control units 118A-118D. In one embodiment, the memory in each of the control units 118A-118D stores multiple control curves and an operator reconfigures one or more mechanical switches, such as the switches 120A-120D, in each of the motor control units 118A-118D, respectively, to select one control curve. In the embodiment of FIG. 1A and FIG. 1B, each one of the motor control units 118A-118D stores four different control curves in memory, and the switches 120A-120D are dual-inline package (DIP) switches with two individual switch elements that enable selection between the four different control curves. In another embodiment, each one of the motor control units 118A-118D is programmed with a single control curve that is selected for use with the corresponding control unit through, for example, a software or firmware programming process.

Figure 3:
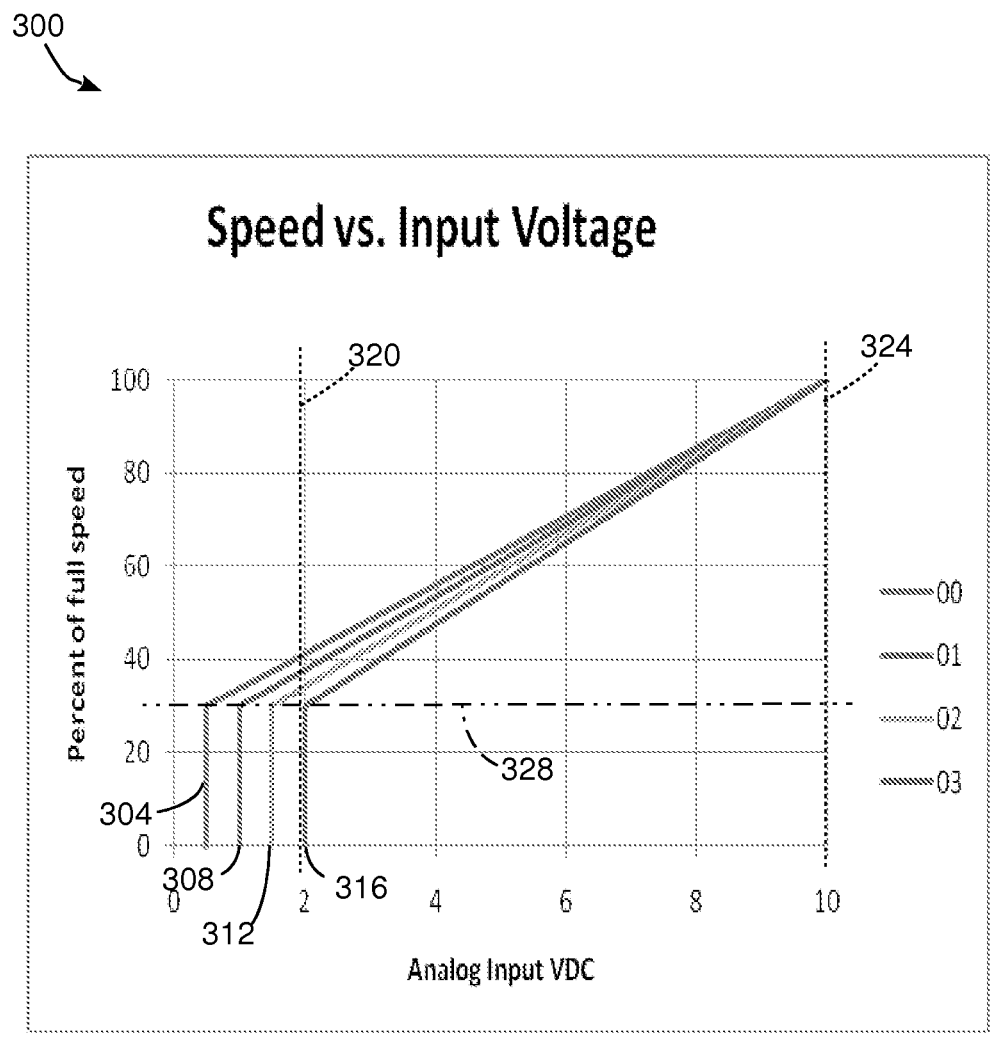
FIG. 3 is a graph of predetermined control curves that are used to operated different motors in an HVAC system at different rates.

FIG. 3 is a graph depicting control curves in one embodiment of the system 100. In FIG. 3, a chart 300 depicts control curves 304, 308, 312, and 316. The chart 300 depicts analog voltage control signal levels in a range from 0 to 10 volts on the horizontal axis and the operational rate of each motor corresponding to the control signal that are expressed as percentages of the maximum operating rate of the motor is depicted on the vertical axis. In the chart 300, the control curves 304-316 converge at 100% operational speed when the analog voltage control signal reaches 10 volts. The control curves 303 diverge from each other as the analog input voltage decreases, with, for example, each control curve having a linear segment with a different slope in the chart 300. In the example of the chart 300, each control curve has a minimum operational rate, which is a 30% operational rate depicted on the cutoff threshold line 328. At any control voltage level below the cutoff point for each one of the control curves, the corresponding motor controller deactivates the motor (e.g. runs the motor at a rate of 0%). In FIG. 3, the cutoff threshold line 328 intersects the control curve 304 at approximately 0.5 volts, the control curve 308 at approximately 1.0 volt, the control curve 312 at approximately 1.5 volts, and the control curve 316 at approximately 2.0 volts.

Referring to FIG. 1A and FIG. 3, the motor control unit 118A is configured to use the control curve 304, the motor control unit 118B is configured to use the control curve 308, the motor control unit 118C is configured to use the control curve 312, and the motor control unit 118D is configured to use the control curve 316. In FIG. 1A, the control signal module 108 in the controller 104 generates a single voltage control signal of approximately 2.0 volts. Each of the motor control units 118A-118D receives the single control voltage signal through, for example, control wires 112. As depicted in FIG. 3, the 2.0 volt control voltage is depicted as vertical line 320 that extends through each of the control curves 304, 308, and 312. The operating speed for each of the motors 116A-116C corresponds to the intersection between the vertical line 320 and the corresponding control curves 304-312 along the vertical axis. For example, the line 320 intersects the control curve 304 at a motor rate of approximately 41%, and in FIG. 1A the motor 116A operates at approximately 41%. Similarly, the line 320 intersects control curve 308 at approximately 38%, and the motor 116B operates at a rate of 38%, and the line 320 intersects the control curve 312 at approximately 34%, and the motor 116C operates at a rate of 34%. For exemplary purposes, the control voltage line 320 is set to be slightly below the cutoff line for the control curve 316. Thus, the line 320 does not intersect the control curve 320 and the motor control unit 318D deactivates the motor 316D.

In FIG. 1A, the controller 104 generates the control signal to operate the motors 116A-116C at reduced rates and to completely deactivate the motor 116. In some operating conditions, the three motors 116A-116C provide sufficient airflow to operate, for example, condensers in an air conditioning or refrigeration system while the motor 116D is deactivated. When deactivated, the motor 116D consumes minimal electrical energy and the control system 100 can operate in an efficient manner.

Referring to FIG. 1B and FIG. 3, the individual motor controllers 118A-118D are configured to enable each of the motors 116A-116D to operate at a rate of 100% in response to a single control signal from the controller 104. In the system 100, the control signal module 108 generates a control voltage of 10 volts, which is depicted as the vertical line 324 in the chart 300. The vertical line 324 intersects each of the control curves 304-316 at the 100% operating rate level on the vertical axis of the chart 300. Consequently, in FIG. 1B each of the motor controllers 318A-318D operates one of the motors 316A-316D, respectively, at a 100% operating rate. Thus, in the system 100, the control curves 304-316 enable the controller 104 to generate a single control signal to operate all of the motors at 100% when the HVAC system runs at maximum capacity. During operation, the controller 104 also generates a plurality of control voltages in addition to the exemplary control voltages 320 and 324 that are shown in FIG. 3. The motor control units 318A-318D operate the respective motors 316A-316D at different rates that are determined by the intersection of the control voltage and the corresponding control curve.

Figure 4:
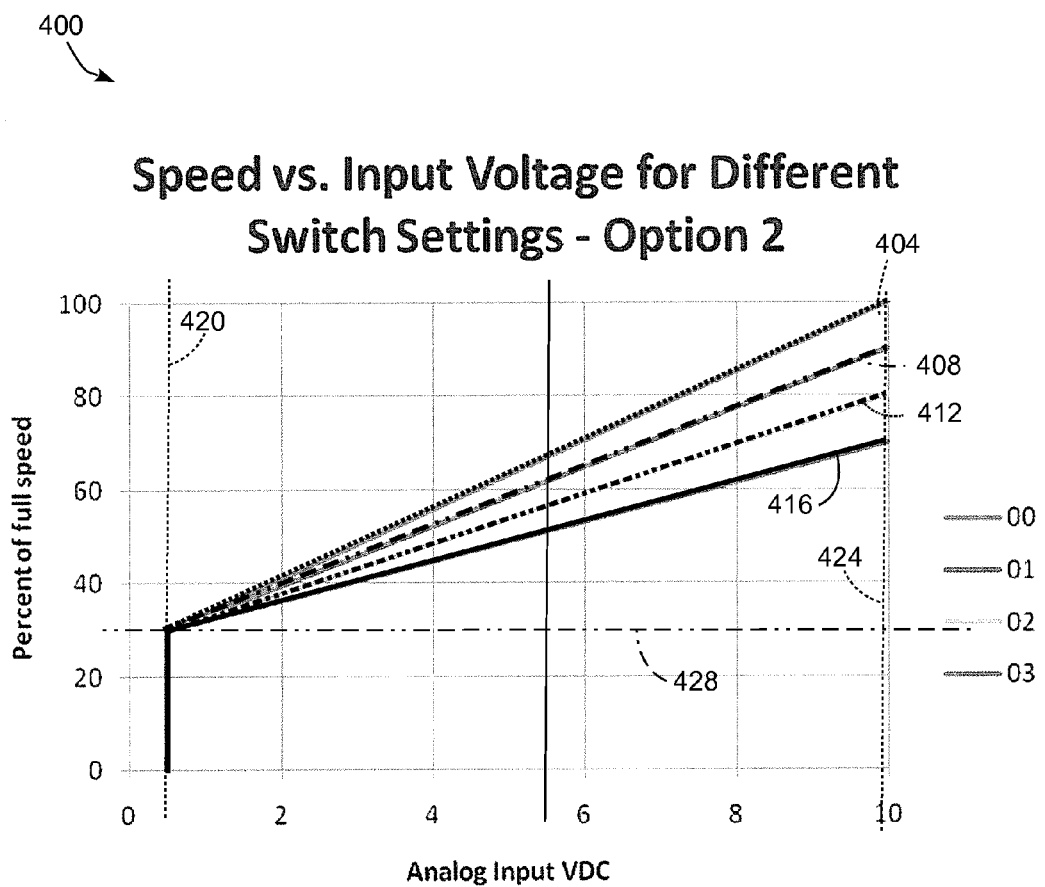
FIG. 4 is another graph of predetermined control curves that are used to operated different motors in an HVAC system at different rates.

FIG. 4 depicts a chart 400 with an alternative set of control curves 404, 408, 412, and 416. In the chart 400, the control curves 404-416 intersect at a control voltage of approximately 0.5 volts, which corresponds to a minimum cutoff operating rate for the motors of, for example, 30% as depicted by the cutoff line 428. In the configuration of FIG. 4, multiple motor control units that are configured to use the different control curves 404-416 each operate motors at the minimum 30% operating rate in response to receiving a single control voltage of approximately 0.5 volts as depicted on the vertical line 420. If the control voltage drops below the 0.5 volt threshold, then each of the motor controllers deactivates the corresponding motor. As the control voltage level increases, the individual motor controllers operate the motors at different rates. In the chart 400, a maximum control voltage of 10 volts depicted along the line 424 intersects the control curve 404 at an operating rate of 100%, the control curve 408 at an operating rate of 90%, the control curve 412 at an operating rate of 80%, and the control curve 41 at an operating rate of 70%. Thus, in the configuration of FIG. 4, only motors that are configured to operate according to the control curve 404 reach a 100% operating rate when the control voltage is at a maximum level.

While FIG. 3 and FIG. 4 depict illustrative embodiments of control curves, alternative configurations of the system 100 include different control curve configurations. For example, alternative configurations include a different number of control curves, such as two or more control curves. While FIG. 1A and FIG. 1B depict four motors that are each configured to use a different control curve as an example, many HVAC systems include a different number of motors and two or more motors can be configured to operate using a single control curve. While the control curves depicted in FIG. 3 and FIG. 4 are linear, other control curve shapes including exponential or quadratic control curves are used in alternative embodiments. The control curves as illustrated in FIG. 3 and FIG. 4 have a positive slope, which is to say that the operating rate of the motors on the control curves increases as the voltage of the control signal increases. In an inverted control signal embodiment, the control curves have negative slopes where the operating rate of the motors on the control curves decreases as the voltage of the control signal increases. In still another embodiment, the control curves include a combination of positive and negative slopes over for different ranges of the control signal between the minimum and maximum control signal voltage.

The embodiments of the control curves that are depicted in FIG. 3 and FIG. 4 are shown as graphics for illustrative purposes. In one embodiment of the software in the motor control units 118A-118D, each control unit stores data corresponding to, for example, the slope of the control curve, the minimum cutoff threshold, and at least one point on the control curve, such as the 100% utilization point at the maximum control signal voltage depicted in FIG. 3. The control software then identifies the rate for operating the motor given the analog voltage of the control signal using, for example, algebraic techniques that are well-known in the art for finding a value of a dependent variable (the motor rate) on a curve given the value of the independent variable (the analog control signal voltage level).

In the embodiment of system 100, the controller 104 and control signal generation module 108 generate analog voltage control signals in a predetermined voltage range of, for example, 0 volts to 10 volts. In one alternative configuration, the control signal generation module 108 generates voltages at a plurality of predetermined levels, such as for example at 0.5 volt increments between 0 volts and 10 volts. In another embodiment, the analog control signal is based on the amplitude of an electrical current instead of voltage. In still another embodiment, the analog control signal is a modulated signal. While analog control signals are common in many HVAC control systems, in an alternative embodiment of the system 100 the controller sends a single command signal that is encoded in a digital data format to all of the motor controller units 118A-118D. For example, in one embodiment the control system 100 sends a digital data frame including a numeric value in a range of 0 to 100 to all of the controller units 118A-118D to select an operating rate for the motors in the system 100. Regardless of the form of the control signal, the controller 104 sends a single control signal to all of the motor controller units 118A-118D and the motor controller units 118A-118D each operate the corresponding motor based on the predetermined control curve and the command signal.

FIG. 2 is a block diagram of a process 200 for configuring and operating a plurality of motors in a motor control system with the motors operating at different rates using a single control signal for all of the motors. In the discussion below, a reference to the process 200 performing an action or a function refers to a controller, such as the system controller 104 or the motor controller units 118A-118D, executing stored instructions to perform the action or function with one or more components in the system. Process 200 is described in conjunction with the motor control system 100 of FIG. 1A and FIG. 1B for illustrative purposes.

Process 200 begins with selection of control curves for individual motor controllers (block 204). In the motor control system 100, a technician or other operator configures the switches 120A-120D in each of the motor control units 118A-118D to select one of the control curves for use with each motor. In the examples of FIG. 1A and FIG. 1B, the switches 120A-120D in the motor control units 118A-118D are configured in one of four different configurations to select one of four different control curves. In alternative configurations, the motor control units are programmed with data corresponding to predetermined control curves via software or firmware updates.

Process 200 continues as a central controller, such as the controller 104 in the system 100, generates a single control signal for all of the motor control units (block 208). As depicted in FIG. 1A and FIG. 1B, the control signal generation module 108 in the controller 104 generates a voltage signal at a selected level and each of the motor control units 118A-118D receives the same control voltage signal. If the motor control units are configured with the control curves 304-316 that are depicted in FIG. 3, then voltage control signal may intersect one or more of the control curves 304-316, or be below the minimum cutoff threshold 328. Using the example control voltage of 2.0 volts described above in conjunction with the line 320 in FIG. 3, the control signal is below the cutoff level for the control curve 316 and the motor control unit 318D in FIG. 1A (block 212) and the motor control unit 318D deactivates the motor 316D (block 216).

For the remaining control curves 304-312, the control voltage signal is above the cutoff threshold (block 212), and each of the motor controllers 318A-318C identifies an operating rate for one of motors 316A-316C, respectively, with reference to the intersection between the control signal 320 and the corresponding control curves 304-312 (block 220). For example, in the configuration of FIG. 1A the controller 118A operates the motor 116A at a rate of 41% compared to the maximum operating rate of the motor in accordance with the control curve 304, the controller 118B operates the motor 116B at a rate of 38% in accordance with the control curve 308, and the controller 118C operates the motor 116C at a rate of 34% in accordance with the control curve 312. The motor controllers 118A-118D continue to operate the motors 116A-116D at the identified rates as long as the control signal remains at the selected voltage level (block 224).

Process 200 continues as the controller 104 generates control signals at various levels for the motor controllers in the motor control system 100 (block 208). During operation, the controller 104 can change the level of the single analog voltage signal to increase or decrease the total operational rate of the motors in the system 100. As depicted above in FIG. 3, if the controller 104 increases the control signal to 10 volts, then each of the motor controllers 118A-118D operates the corresponding motor 116A-116D at a 100% rate in accordance with the control curves 304-316. The controller 104 can also generate control signals at intermediate levels to operate the motors 116A-116D at various intermediate rates, to deactivate some of the motors while operating others at intermediate rates, or to deactivate all of the motors.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A control system for operating a plurality of electric motors comprising:
   a first electric motor including a first electric motor control unit, the first electric motor control unit being configured to:
      operate the first electric motor at a first rate in response to receiving a control signal at a first level and at a second rate in response to receiving the control signal at a second level; and
      operate the first electric motor at a plurality of intermediate operating rates between the first rate and the second rate in accordance to a first predetermined control curve in response to receiving the control signal at an intermediate level between the first level and the second level;
   a second electric motor including a second electric motor control unit, the second electric motor control unit being configured to:
      operate the second electric motor at the first rate in response to receiving the control signal at the first level and at a third rate in response to receiving the control signal at the second level, the third rate being different than the second rate; and
      operate the second electric motor at another plurality of intermediate operating rates between the first rate and the third rate in accordance to a second predetermined control curve in response to receiving the control signal at the intermediate level between the first level and the second level; and
   a controller operatively connected to the first electric motor control unit and the second electric motor control unit, the controller being configured to:
      generate a single control signal as the control signal to operate both the first electric motor and the second electric motor, the control signal being at one of the first level, the second level, and one of a plurality of intermediate levels between the first level and the second level.

2. The system of claim 1 wherein the first rate is a maximum rate for the first electric motor and the second electric motor.

3. The system of claim 1 wherein the second rate is a minimum operating rate for the first electric motor in which the first electric motor continues to move and the third rate corresponds to the second electric motor being halted.

4. The system of claim 1 wherein the first electric motor operates at a first intermediate rate in accordance with the first predetermined control curve and the second electric motor operates at a second intermediate rate in accordance with the second predetermined control curve in response to receiving the single control signal at one of the plurality of intermediate levels, the first intermediate rate being greater than the second intermediate rate.

5. The system of claim 1 wherein the first rate is a minimum operating rate for the first electric motor and the second electric motor at which the first electric motor and the second electric motor continue to move.

6. The system of claim 5 wherein the second rate is a maximum operating rate for the first electric motor and the third rate is an operating rate for the second electric motor that is less than a maximum operating rate for the second electric motor.

7. The system of claim 1, the controller being further configured to:
   generate the single control signal as an analog voltage signal with a voltage between a first predetermined voltage level and a second predetermined voltage level.

8. The system of claim 1, each of the first electric motor control unit and the second electric motor control unit further comprising:
   a switch configured to select the first predetermined control curve in a first configuration and to select the second predetermined control curve in a second configuration, the switch in the first electric motor control unit being in the first configuration and the switch in the second electric motor control unit being in the second configuration.

9. A method of controlling electric motors comprising:
   generating a single control signal at one of a first level, a second level, and a plurality of intermediate levels between the first level and the second level;
   operating a first electric motor at a first rate in response to receiving the single control signal at the first level;
   operating the first electric motor at a second rate in response to receiving the single control signal at the second level;
   operating the first electric motor at a plurality of intermediate rates between the first rate and the second rate in accordance to a first predetermined control curve in response to receiving the control signal at one of the plurality of intermediate levels;

operating a second electric motor at the first rate in response to receiving the single control signal at the first level;

operating the second electric motor at a third rate in response to receiving the single control signal at the second level, the third rate being different than the second rate; and operating the second electric motor at another plurality of intermediate operating rates between the first rate and the third rate in accordance to a second predetermined control curve in response to receiving the control signal at one of the plurality of intermediate levels.

10. The method of claim 9 wherein the first rate is a maximum rate for the first electric motor and the second electric motor.

11. The method of claim 9 wherein the second rate is a minimum operating rate for the first electric motor in which the first electric motor continues to move and the third rate corresponds to the second electric motor being halted.

12. The method of claim 9 wherein the first electric motor operates at a first intermediate rate in accordance with the first predetermined control curve and the second electric motor operates at a second intermediate rate in accordance with the second predetermined control curve in response to receiving the single control signal at one of the plurality of intermediate levels, the first intermediate rate being greater than the second intermediate rate.

13. The method of claim 9 wherein the first rate is a minimum operating rate for the first electric motor and the second electric motor at which the first electric motor and the second electric motor continue to move.

14. The method of claim 9 wherein the second rate is a maximum operating rate for the first electric motor and the third rate is an operating rate for the second electric motor that less than a maximum operating rate for the second electric motor.

15. The method of claim 9 further comprising:
generating the single control signal as an analog voltage signal with a voltage between a first predetermined voltage level and a second predetermined voltage level.

* * * * *